(12) United States Patent
Wang et al.

(10) Patent No.: US 12,445,343 B1
(45) Date of Patent: Oct. 14, 2025

(54) NETWORK DIAGNOSIS

(71) Applicants: Lemon Inc., Grand Cayman (KY);
Beijing Zitiao Network Technology Co., Ltd., Beijing (CN)

(72) Inventors: Haopei Wang, Los Angeles, CA (US); Anubhavnidhi Abhashkumar, Los Angeles, CA (US); Wei Zhou, Los Angeles, CA (US); Jian Wang, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/633,332

(22) Filed: Apr. 11, 2024

(51) Int. Cl.
*H04L 41/16* (2022.01)
*H04L 41/0604* (2022.01)
*H04L 41/12* (2022.01)

(52) U.S. Cl.
CPC .......... *H04L 41/0627* (2013.01); *H04L 41/12* (2013.01); *H04L 41/16* (2013.01)

(58) Field of Classification Search
CPC ...... H04L 41/0627; H04L 41/12; H04L 41/16
See application file for complete search history.

(56) References Cited

U.S. PATENT DOCUMENTS

| | | | | |
|---|---|---|---|---|
| 2020/0012457 A1* | 1/2020 | Ota | ............. | G06F 11/0751 |
| 2022/0217196 A1* | 7/2022 | Ting | ............. | G06N 3/045 |
| 2023/0103033 A1* | 3/2023 | Yuan | ............. | G06N 3/0464 |
| | | | | 705/2 |
| 2023/0142554 A1* | 5/2023 | Miyata | ............. | G06V 30/413 |
| | | | | 358/1.14 |
| 2023/0395253 A1* | 12/2023 | Long | ............. | G16H 40/67 |
| 2024/0121636 A1* | 4/2024 | Wang | ............. | H04L 41/16 |
| 2024/0171480 A1* | 5/2024 | Sheoran | ............. | H04L 41/5067 |

FOREIGN PATENT DOCUMENTS

| | | |
|---|---|---|
| CN | 114358123 A | 4/2022 |
| CN | 116227586 A | 6/2023 |

* cited by examiner

*Primary Examiner* — Minh Chau Nguyen
(74) *Attorney, Agent, or Firm* — BakerHostetler

(57) ABSTRACT

A method is proposed for network diagnosis. In the method, a user query on the network diagnosis expressed in a natural language is obtained. A target workflow including a set of machine-executable tasks for a network diagnosis process on a target category of the network diagnosis is determined based on the user query and a diagnosis result is generated by performing the set of machine-executable tasks in a network diagnosis process.

20 Claims, 3 Drawing Sheets

NETWORK DIAGNOSIS

FIELD

The present disclosure generally relates to the field of computer, and more specifically, to methods, devices, and computer program products for network diagnosis.

BACKGROUND

In large-scale data center networks, answering network diagnosis queries from users still heavily rely on manual on-call services. However, this approach requires extensive experience and considerable efforts from network engineers who must repeatedly go through lots of monitoring dashboards and logs.

SUMMARY

In a first aspect of the present disclosure, there is provided a method of multi-agent debate. The method includes: obtaining, a user query on the network diagnosis expressed in a natural language; determining, based on the user query, a target workflow including a set of machine-executable tasks for a network diagnosis process on a target category of the network diagnosis, wherein the target category is associated with one or more network components; and generating a diagnosis result by performing the set of machine-executable tasks in a network diagnosis process.

In a second aspect of the present disclosure, there is provided an electronic device. The electronic device comprises: a computer processor coupled to a computer-readable memory unit, the memory unit comprising instructions that when executed by the computer processor implements a method according to the first aspect of the present disclosure.

In a third aspect of the present disclosure, there is provided a computer program product, the computer program product comprising a computer readable storage medium having program instructions embodied therewith, the program instructions executable by an electronic device to cause the electronic device to perform a method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

Figure 1:
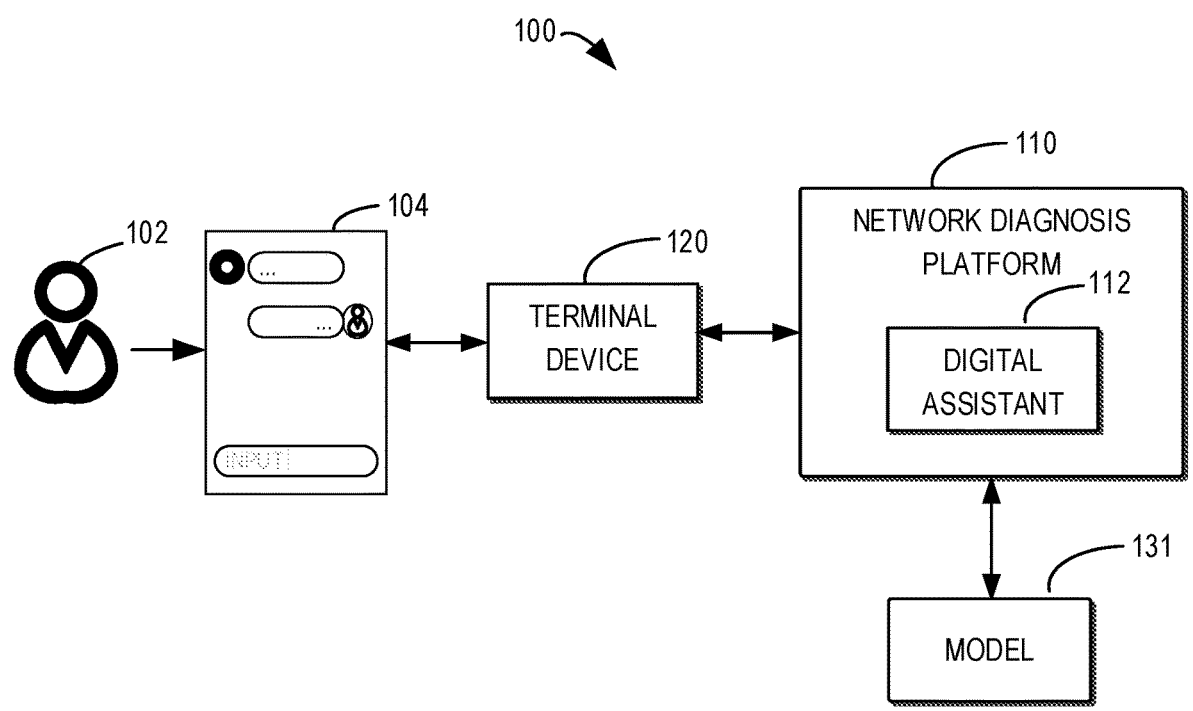
FIG. 1 illustrates an example environment in which example embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below. In the following description and claims, unless defined otherwise, all technical and scientific terms used herein have the same meaning as commonly understood by one of ordinary skills in the art to which this disclosure belongs.

It may be understood that data involved in the present technical solution (including but not limited to the data itself, the acquisition or use of the data) should comply with requirements of corresponding laws and regulations and relevant rules.

It may be understood that, before using the technical solutions disclosed in various embodiment of the present disclosure, the user should be informed of the type, scope of use, and use scenario of the information involved in the present disclosure in an appropriate manner in accordance with relevant laws and regulations, and the user's authorization should be obtained.

For example, in response to receiving an active request from the user, prompt information is sent to the user to explicitly inform the user that the requested operation will need to acquire and use the user's information. Therefore, the user may independently choose, according to the prompt information, whether to provide the information to software or hardware such as electronic devices, applications, servers, or storage media that perform operations of the technical solutions of the present disclosure.

As an optional but non-limiting implementation, in response to receiving an active request from the user, the way of sending prompt information to the user, for example, may include a pop-up window, and the prompt information may be presented in the form of text in the pop-up window. In addition, the pop-up window may also carry a selection control for the user to choose "agree" or "disagree" to provide the information to the electronic device.

It may be understood that the above process of notifying and obtaining the user authorization is only illustrative and does not limit the implementation of the present disclosure. Other methods that satisfy relevant laws and regulations are also applicable to the implementation of the present disclosure.

As used herein, the term "model" is referred to as an association between an input and an output learned from training data, and thus a corresponding output may be generated for a given input after the training. The generation of the model may be based on a machine learning technique. In general, a machine learning model may be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Example Environment

FIG. 1 illustrates a block diagram of an example environment 100 in which various embodiments of the present disclosure may be implemented. The environment 100 of FIG. 1 comprises a network diagnosis platform 110, which may support an operation of the network diagnosis. A user 102 may communicate with the network diagnosis platform 110 via, for example, a terminal device 120 associated with the user 102. The user 102 may be referred to as a user of the network diagnosis platform 110. In some example embodiments, the network diagnosis platform 110 may include or be implemented as a digital assistant 112.

The digital assistant 112 may be configured to have the ability for intelligent conversations. As shown in FIG. 1, the digital assistant 112 may be integrated within the network diagnosis platform 110 as part of the network diagnosis platform 110 to assist in executing task processing within the network diagnosis platform 110.

In some other example embodiments, the digital assistant 112 may be configured as a standalone application, such as a web application or other types of applications. In such an example, the digital assistant 112 and the network diagnosis platform 110 may be considered as the same application. The digital assistant 112 may be provided to assist users in various task processing needs in different applications and scenarios. During the interaction with the digital assistant 112, the user inputs an interaction message, and the digital assistant 112 responds to the user input to provide a reply message. Typically, the digital assistant 112 may support users to input questions in natural language and perform tasks and provide responses based on their understanding and logical reasoning abilities of natural language input.

In some example embodiments, the digital assistant 112 may interact with the user 102 as a contact person. For example, the digital assistant 112 may be implemented in instant messaging (IM) applications. The digital assistant 112 may interact with the user 102 in a single chat session. In some embodiments, the digital assistant 112 may interact with multiple users in a group chat session including multiple users.

For each user 102, an interaction window 104 of the network diagnosis platform 110 or the digital assistant 112, e.g., a session window with the digital assistant 112, may be presented via the terminal device 120. The user 102 may input session messages in the session window. The network diagnosis platform 110 may determine the reply message of digital assistant 112 and present it to the user 102 in the interaction window 104.

In some example embodiments, depending on the configuration of the network diagnosis platform 110, the interaction messages with the network diagnosis platform 110 may include multimodal forms of messages, such as text messages (such as natural language text), voice messages, image messages, video messages, and so on.

A client of the network diagnosis platform 110 may be operated at the terminal device 120 of the user 102 and may support an interaction between the user 102 and the network diagnosis platform 110.

In some example embodiments, the implementation of at least some functions of the network diagnosis platform 110 and/or the implementation of at least some functions of the digital assistant 112 in the network diagnosis platform 110 may be based on a model. During the creation and/or operation of the network diagnosis platform 110, one or more models 130, e.g., the capabilities of the one or more models 130, can be used. In the network diagnosis platform 110, digital assistant 112 may utilize model 130 to understand user input and provide responses to users based on the output of model 130.

Although the model 130 is separated from the network diagnosis platform 110 as shown in FIG. 1, the one or more model 130 may be deployed at the network diagnosis platform 110 or a remote server. In some example embodiments, the model 130 may be a machine learning model, a deep learning model, a learning model, a neural network, etc. In some other embodiments, the model may be based on a language model (LM). The language models may acquire question and answer abilities by learning from a large amount of corpus. The model 130 may also be based on other appropriate models.

It is to be understood that that the network diagnosis platform 110 may be operated on appropriate electronic devices. The electronic devices here may be referred to as any type of device with computing power, including terminal devices or server devices.

For example, the terminal device may be any type of mobile terminal, fixed terminal, or portable terminal, including mobile phones, desktop computers, laptops, netbooks, tablets, media computers, multimedia tablets, personal communication system (PCS) devices, personal navigation devices, personal digital assistants (PDAs), audio/video players, digital cameras/cameras, positioning devices, television receivers, radio broadcast receivers, e-book devices, gaming devices, or any combination of the aforementioned, including accessories and peripherals of these devices or any combination thereof.

For example, the server device may include a computing system/server, such as mainframe, edge computing nodes, computing devices in the cloud environment, and so on. In some embodiments, the management platform 110 may be implemented based on cloud services.

It should be understood that the description of the structure and function of the environment 100 is only for illustrative purposes and does not imply any limitations on the scope of this disclosure.

As described above, solving user problems in data center networks currently relies on a large number of manual services and does not have a good automation solution. The reason behind this comes from both the network user side and the network engineer side.

From the perspective of network users, limited by the network domain knowledge and necessary permissions, they normally lack a network-wide view and are not able to access a variety of network monitoring primitives. As a result, network users often need to turn to network engineers for manual assistance.

From the perspective of network engineers, they have a variety of network monitoring primitives to monitor, a large amount of monitoring data to process, and too many small but not negligible network incidents to investigate. As a consequence, extracting useful information from the enormous data and replying to network users becomes highly tedious and time consuming work, and highly relies on the expertise of each network engineer. Therefore, we argue that there is a gap between the network diagnosis needs of network users and network monitoring primitives in big data center networks.

Embodiments of the present disclosure propose solutions for network diagnosis. According to embodiments of the present disclosure, a user query on the network diagnosis expressed in a natural language is obtained. A target workflow including a set of machine-executable tasks for a network diagnosis process on a target category of the network diagnosis is determined based on the user query and a diagnosis result is generated by performing the set of machine-executable tasks in a network diagnosis process.

Example Process of Network Diagnosis

Example embodiments of the present disclosure will be described in detail below with reference to the accompanying drawings.

Inspired by the technique of task-oriented dialogue systems in the natural language processing (NLP) domain, a virtual assistant (chatbot) may be built to take the networking related queries in natural language and leverage the experience from network engineers to perform proper diagnosis functions.

Figure 2:
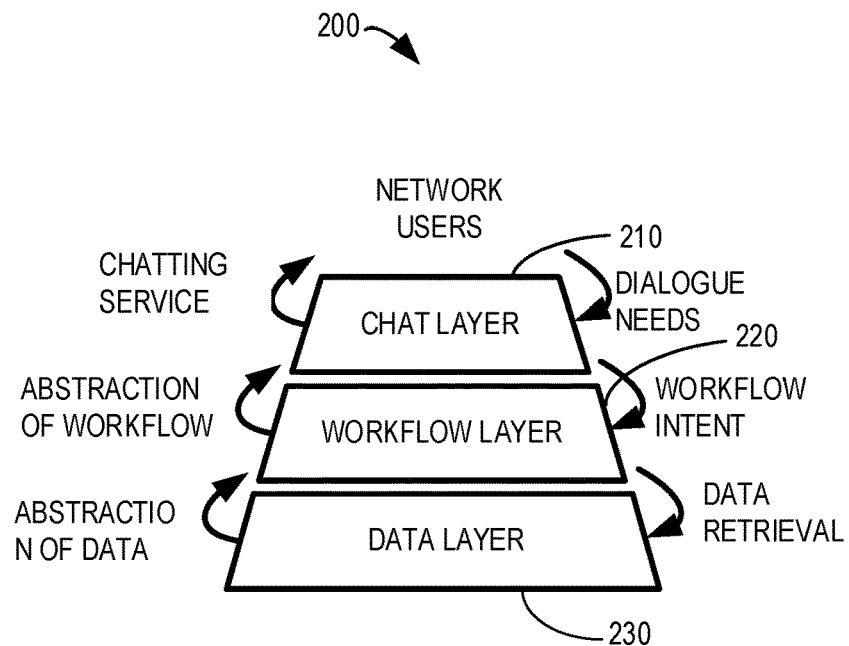
FIG. 2 illustrates a diagram of an example of level of abstraction in NETASSISTANT according to some embodiments of the present disclosure.

FIG. 2 illustrates a diagram of an example of level of abstraction in NETASSISTANT according to some embodiments of the present disclosure. As shown in the FIG. 2, the main objectives of this solution are into three levels of needs, namely a chat layer 210, a workflow layer 220 and a data layer 230. Network users may have the chat needs from the chat layer 210. Then the chat layer 210 may require appropriate diagnosis functions from the workflow layer 220. The workflow layer 220 may need efficient data retrieval from the network monitoring primitives, e.g., from the data layer 230. Conversely, each layer provides a corresponding abstraction to its upper layer.

Figure 3:
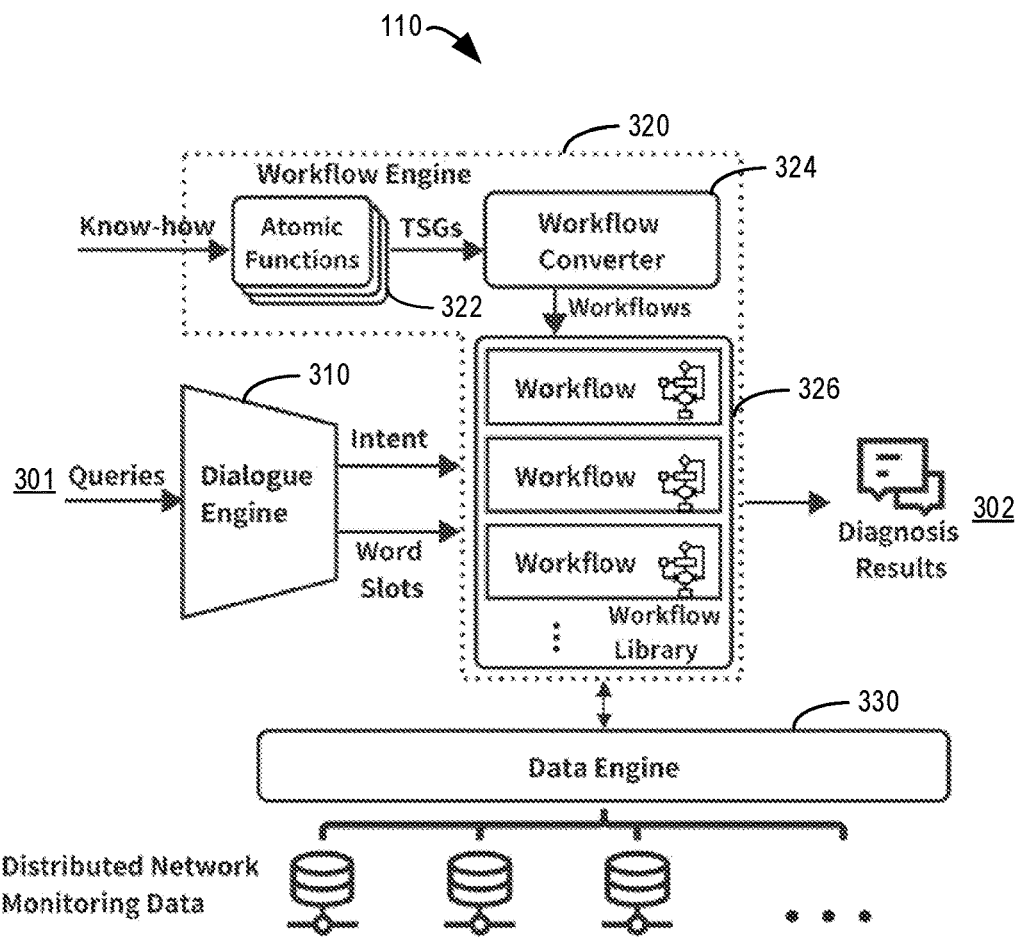
FIG. 3 illustrates an example of a structure of a network diagnosis platform according to some embodiments of the present disclosure.

FIG. 3 illustrates an example of a structure of a network diagnosis platform 110 according to some embodiments of the present disclosure. With respect to FIG. 3, an example process of the network diagnosis according to the present disclosure will be described in detail.

As shown in FIG. 3, the network diagnosis platform 110 may consist of three main functional modules, namely a dialogue engine module 310, which provides a dialogue environment for users and understand the intent and word slots from the user queries; a workflow engine module 320, which converts the knowledge and experience from network engineers into workflows and processes proper workflows for each user query; and a data engine module 330, which manages all underlying distributed network monitoring data storage and provides high-performance data retrieval.

A user query 301 on the network diagnosis may be obtained by the dialogue engine module 310. For example, the user query 301 may be expressed in a natural language. For example, the dialogue engine module 310 may provide network users (e.g., the user 102 as shown in FIG. 1) with a dialogue environment that presents a conversational experience with multiple rounds of question and answer. The input from the user 102 may be plain text in natural language. The output form may be rich text, pictures, interactive components, and hyperlinks.

For a task-oriented dialogue system to be proposed according to the present disclosure, the key challenge is to build the Natural Language Understanding (NLU) component. The key target of the NLU component is to understand the word slots and intent. The intent of each question may decide which diagnosis function (workflow) to be used for the network diagnosis, and the word slots will be the input parameters.

The dialogue engine module 310 may provide session-based dialogue management to manage user questions. All user questions belonging to the same session will be converted into a question list for understanding. That is, the dialogue engine module 310 may obtain the user query based on a session-based dialogue. The user query may comprise one or more questions.

The first step for understanding is to understand and parse the word slots from the questions. The word slot here could be the name of any component in the data center networks. Therefore, nouns from a network may be collected and categorized into different types according to their role in the networks, e.g., region, country, state/province, AZ, office, building, pod, subnet/cluster, server, switch, circuit, and optical module.

These words may be divided into two sets of words. The first word set contains oral expressions of the above terminologies and the terminologies themselves (network users may also know and directly use the terminologies in their questions), which may be referred to as an Oral Naming Set (hereinafter may also be referred to as a first naming set). The second word set contains terminologies strictly defined in our datacenter network specification, which may be referred to as a Specification Naming Set (hereinafter may also be referred to as a second naming set)

The Specification Naming Set may be a subset of the Oral Naming Set. A mapping between the two sets can be obtained and/or built by the network diagnosis platform 110. These two sets may be used for the word slots parsing, standardizing, and encoding. The Oral Naming Set may be first used to parse the word slots from the user questions. The mapping between the two sets and the Specification Naming Set then may be used to standardize each word. After that, each word may be used by using its category name. For example, the word "Santa Clara" may be encoded with "available_zone_#14" from the original sentence for further intent understanding and parse a parameter {"az_1": ["US-WEST-1"]} for workflow processing.

For example, the network diagnosis platform 110, e.g., by using the dialogue engine module 310, may parse a plurality of reference word slots from the user query 301, e.g., one or more question related to the user query 301. If the network diagnosis platform 110 determines that at least one first word slot, extracted from the plurality of reference word slots, belongs to a first naming set, the network diagnosis platform 110 may determine, from a second naming set, at least one second word slot corresponding to the at least one first word slot based on a mapping between the first naming set and the second naming set. Then the network diagnosis platform 110 may encode the at least one second word slot with respective category name.

Encoded questions may be processed for intent understanding (i.e., text classification). As an option, a word-level Convolutional Neural Network (CNN) may be used for the classify the category/intent of the given questions. As another option, a Large Language Model (LLM) solution may be considered.

In general, the machine learning model is used for classifying the at least one encoded second word slot to determine a target category/intent of the network diagnosis. In the Word-Level CNN-Based Solution, a training-based classifier may be used to classify the category/intent of the given questions. To achieve this, a considerable number of questions may be collected for each intent as the training dataset for a word-level CNN classifier offline. In the runtime after the encoding process, the classifier generates a classification score of the text for each intent and selects matched intent(s) based on a predefined threshold.

In the LLM-Based Solution, the powerful comprehension skills of the LLM may be used to do multiple-choice questions. A few-shot prompting may be used to add in-context learning where different intents in the prompt are demonstrated and let the language model make selections. An example of the prompt may be represented as: "Intent check_switch_traffic is to check the traffic indica-tors of a switch. Intent check_host_network is to . . . Please select corresponding intents for the following questions: "My devbox is unreachable. VM host_ip_#19.""

Since more than 100 intents may already have, which will make the generated prompt sentence too long, a relatively smaller set of intents (around 10) may be selected to shorten the prompt. To achieve this, vector embedding is applied to both the user questions and the description of intents and a similarity-based searching method may be utilized to select the intents.

For example, a set of prompts associated with a plurality of reference categories corresponding to the at least one encoded second word slot may be provided to the LLM. If a reference category is selected by the LLM based on the set of prompts, the reference category may be determined as the target category of the network diagnosis.

If the determined target category and associated word slots are clear, the network diagnosis platform 110 may proceed with the diagnosis function associated with the target category. If the target category is not clear, the network diagnosis platform 110 may interact with the user to indicate the user to supplement the missing of the information. If no target category is determined, the network diagnosis platform 110 may respond with the manual page containing how to use the network diagnosis platform 110 and examples of user query.

Then the network diagnosis platform 110 may, in a case where the determined target category and associated word slots are clear, determine a target workflow including a set of machine-executable tasks for a network diagnosis process on the target category of the network diagnosis. The target workflow may be selected from a workflow library 326 in the workflow engine module 320, which may provide network engineers with the framework to create multiple workflows based on their expertise.

For example, the workflow engine module 320 may comprise atomic functions 322, a workflow converter 324, and the workflow library 326 as shown in FIG. 3, which work seamlessly together to enable efficient workflow creation and execution. The expressive atomic functions 322 allow network engineers to create simple, flexible, and interactive diagnosis logic. The workflow converter 324 converts the logic into executable workflows, and the workflow library 326 supports triggering and executing the workflows at runtime.

The atomic functions 322 form the building blocks of our workflow system, with each encapsulating a particular method unique to a specific network entity and its metrics data. Entities could include switches, links, interfaces, available zones, and more. The decision-making method checks the metrics data of the entity over a time range and determines if there is any abnormality. Additionally, atomic functions 322 may include an optional action process to analyze specific scenarios within the workflow, such as pausing a service on a switch to check if it caused overload or triggering a traceroute to display possible routing paths.

For all common network components, a set of atomic functions may be tailored based on the monitoring primitives to meet various diagnosis requirements. For example, based on the sFlow data of a link, if the overall utilization is high, or if there is any kind of traffic violating the QoS rules, or if there is any service traffic experiencing a sudden increase or decrease can be checked. There may be multiple algorithm implementations for the same function. The threshold details can be customized based on the experience and expertise.

The set of atomic functions 322 may be configured to become a Troubleshooting Guide (TSG). A TSG comprises multiple atomic functions that al-low specifying the data entity to be analyzed within a given time range using decision-making logic. The TSG operates like a state machine, existing at any given point at a specific stage (atomic function). The outcome of each atomic function determines the transitions between stages.

The configuration of the TSGs may be performed through a visual interface. The configuration includes the selection and threshold of atomic functions, arranging them into a flowchart and specifying the input such as switch names or time periods. It is possible to customize different versions of a TSG with the same name depending on the input value. For example, switches from different vendors may have different check_switch_hardware TSGs. TSGs can be updated and adjusted dynamically with the change of network architecture.

Then the workflow converter 324 may convert the TSGs to executable workflow logic and add essential exception handling, supplementary background knowledge, associated network events, and common help entries. For instance, all workflows will be added the logic to check if there are any known/ongoing network issues or changes and recommend other tools for non-network issues. Executable workflows may be stored in the workflow library 326, which may be responsible for selecting and executing proper workflow based on the intent and parameters from the Dialogue Engine. An example of the most commonly used workflows is listed as below:

TABLE 1

| Workflows | Explanation |
| --- | --- |
| check_pod_network | Data center level network status workflows, |
| check_az_network | including connectivity (internal, external, |
| check_idc_network | overlay, underlay, v4, v6, subnets and etc.), |
| check_region_network | bandwidth & utilization (different types of |
|  | links, different granularity), switches |
|  | and existing network incidents & changes. |
| check_phy_ip_network | IP level network status workflows, including |
| check_iaas_ip_network | software stack check, hardware status check, |
| check_vip_network | network environment |
| check_rdma_network | (nearby switches) check |
| check_p4_network |  |
| check_switch_reachable | Switch health status check, including metrics |
| check_switch_hardware | from switch OS (syslog), protocol (e.g., |
| check_switch_traffic | SNMP, BMP), hardware (e.g., linecard, |
| check_switch_config | OTN) and external monitors. |
| check_direct_connect | Physical link level status workflows, mainly |
| check_bbone_link | used by network team, including physical |
| check_isp_link | metrics, traffic and protocol status checking. |
| check_storage_service | Network service level workflow, checking |
| check_computing_service | network status of involved servers, upstream |
|  | and downstream network traffic, QoS |
|  | management and etc. |

That is, the workflow engine module 320 may be used for creating/providing/updating the plurality of candidate workflows for processing the network diagnosis on respective categories. Each candidate workflow may comprise a set of machine-executable tasks that are ordered by a specific processing logic for a category.

The network diagnosis platform 110 may retrieve monitoring data from the data engine module 330 to perform the set of machine-executable tasks in the target workflow in the network diagnosis process. That is, the data engine module 330 may be responsible for providing the abstraction and query entry of network monitoring data.

In some embodiments, the data engine module 330 may utilize two strategies to ensure efficient data retrieval. If data sources that are relatively low in volume, such as switch configurations, can be stored and analyzed in their current form. These sources do not change frequently, so analyzing them in real time is feasible.

While the data generated may contain a significant amount of normal, expected behavior, only a small fraction of it is valuable for diagnosis. As such, only the data for anomalies may be monitored, which are flagged as alerts. The execution of some atomic functions that use high volume data sources may be moved to become always-on operators generating alerts. The alerts are then tracked, and in a case where high-volume data sources are queried, the alerts may be retrieved instead of the full data. For example, only a small portion of syslog data, namely BGP flapping or line card errors, can actually help diagnose underlying network issues.

Upon generating the diagnosis result 302 by performing the set of machine-executable tasks in a network diagnosis process, the network diagnosis platform 110 may provide the diagnosis result 302 to a user from which the user query is received. It is possible that the diagnosis result 302 may also be provided to network engineers who may solve the network issue based on the diagnosis result 302 and/or a network issue processing device which may solve the network issue by performing appropriate machine-executable tasks.

Some examples of network diagnosis by using the diagnosis platform 110 will be further described as below.

As an example, a user may query an IP address as his/her SQL cluster encountered a connection exception to this instance. The network diagnosis platform 110 may identify it as an IP of a virtual machine and performed the check_iaas_ip_network workflow. After conducting a multi-dimensional diagnosis on this virtual machine, the workflow found that the link between its physical machine and the Top-of-Rack (ToR) switch started to have considerable CRC errors from the SNMP monitoring data, and the ToR switch also reported CRC errors from syslog. Thus, the network diagnosis platform 110 may respond with an unhealthy diagnosis conclusion and informed the current on call network engineer about this issue.

As another example, a user may report a suspicious network issue in a data center at around 2 AM since her managed service had a wave of failures, and the log showed many connection errors. The network diagnosis platform 110 may perform the check_idc_network workflow and found that there was a spike of packet drop and latency increase, which lasted for around 2 min according to the connectivity monitoring results. Involved IP pairs can be aggregated into a /48 IPv6 subnet. The workflow further noticed that there were several BGP withdrawn events whose peers pointed to the same switch and several ECMP imbalance exceptions from nearby switches syslog. Thus, the network diagnosis platform 110 may make a conclusion that there was a short-lived network issue and the root cause was due to a switch down event.

As a further example, a user may query the network status of his/her service, to investigate the cause of performance degradation in a core service. The network diagnosis platform 110 may discover multiple ping drops and high latency alerts between regions, along with configuration changes that were made to bring up a plane. The network diagnosis platform 110 may also find the network team had already noticed and engaged in this issue in advance and had an initial conclusion that the configuration change might be the root cause. Therefore, the network diagnosis platform 110 may respond with the conclusion from the network team and suggested a downgrade to the service algorithm.

In this way, the network diagnosis solution proposed in the present disclosure can significantly reduce the workload of both network users and network engineers and provide excellent user experience and performance.

Example Process and Device

Figure 4:
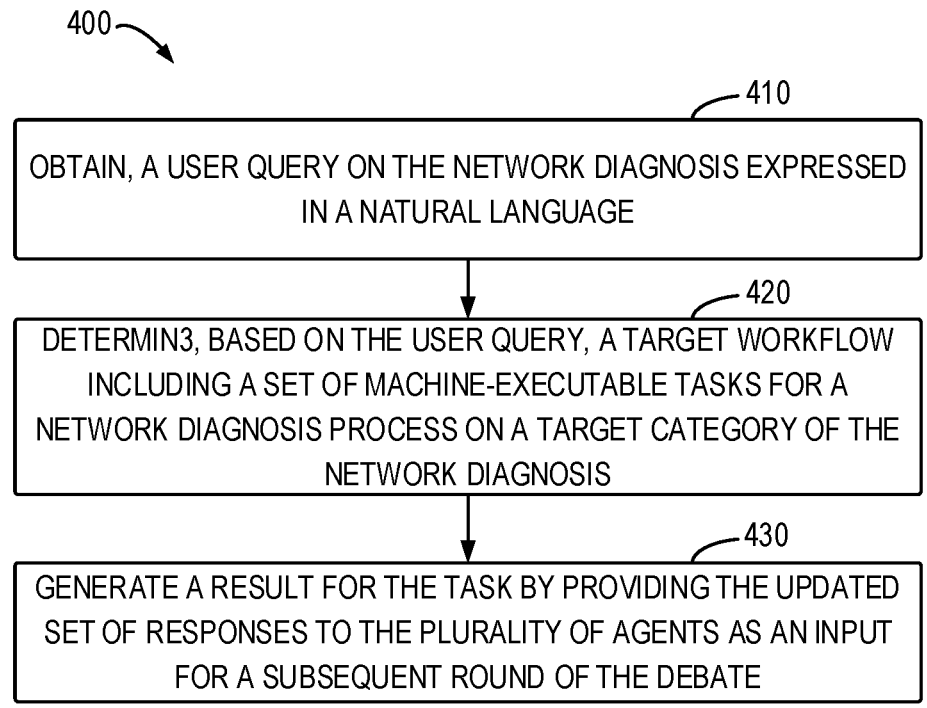
FIG. 4 illustrates an example flowchart of a method of multi-agent debate according to some embodiments of the present disclosure.

FIG. 4 illustrates a flowchart of a method 400 for network diagnosis in accordance with some example implementations of the present disclosure. The method 400 may be implemented at the network diagnosis platform 110 as illustrated in FIG. 1.

At a block 410, a user query on the network diagnosis expressed in a natural language is obtained. At a block 420, A target workflow including a set of machine-executable tasks for a network diagnosis process on a target category of the network diagnosis is determined based on the user query. The target category is associated with one or more network components. At a block 430, a diagnosis result by performing the set of machine-executable tasks in a network diagnosis process is generated.

In some embodiments, obtaining the user query comprises: obtaining the user query based on a session-based dialogue, wherein the user query comprises one or more questions.

In some embodiments, determining the target workflow comprises: parsing a plurality of reference word slots from the user query; and in accordance with a determination that at least one first word slot, extracted from the plurality of reference word slots, belongs to a first naming set, determine, from a second naming set based on a mapping between the first naming set and the second naming set, at least one second word slot corresponding to the at least one first word slot; determining the target category of the network diagnosis based on the at least one second word slot; and selecting, based on the target category, the target workflow from a plurality of candidate workflows in a workflow library.

In some embodiments, obtaining the mapping between the first naming set and the second naming set, wherein the mapping is determined based on a first set of network terminologies expressed in oral manner contained in the first naming set and a second set of network terminologies expressed in specific manner contained in the second naming set.

In some embodiments, determining the target category of the network diagnosis based on the at least one second word slot comprises: encoding the at least one second word slot with respective category name; and determining the target category based on the classification of the at least one encoded second word slot by using a machine learning model.

In some embodiments, the machine learning model comprises a large language model, LLM, and wherein the at least one encoded second word slot is classified by using the LLM by: determining a set of prompts associated with a plurality of reference categories corresponding to the at least one encoded second word slot; and obtaining a reference category selected by the LLM based on the set of prompts; and determining the reference category as the target category of the network diagnosis.

In some embodiments, a method 400 further comprises obtaining the plurality of candidate workflows for processing the network diagnosis on respective categories, wherein each candidate workflow comprises a set of machine-executable tasks that are ordered by a specific processing logic for a category.

In some embodiments, a method 400 further comprises in accordance with a determination of anomalies of one or more operating network data, identifying the one or more operating network data as a set of alerts.

In some embodiments, generating the diagnosis result comprises: check whether at least one alert, retrieved from the set of alerts, are associated with the set of machine-executable tasks in the network diagnosis process; and in accordance with a determination that the at least one alert is associated with the set of machine-executable tasks in the network diagnosis process, performing the set of machine-executable tasks based on network monitoring data corresponding to the at least one alert.

In some embodiments, a method 400 further comprises providing the diagnosis result to a user from which the user query is received.

In some embodiments of the present disclosure, there is provided a non-transitory computer program product, the non-transitory computer program product comprising a computer readable storage medium having program instructions embodied therewith, the program instructions executable by an electronic device to cause the electronic device to perform a method of multi-agent debate. The method comprising: obtaining a set of responses to a task expressed in a natural language, the set of responses generated by a plurality of agents in at least one round of a debate for the task; updating the set of responses by at least one of selecting responses from the set of responses, or adjusting at least one response in the set of responses; and generating a result for the task by providing the updated set of responses to the plurality of agents as an input for a subsequent round of the debate. In some implementations of the present disclosure, the method further comprises other steps as described in the present disclosure.

Figure 5:
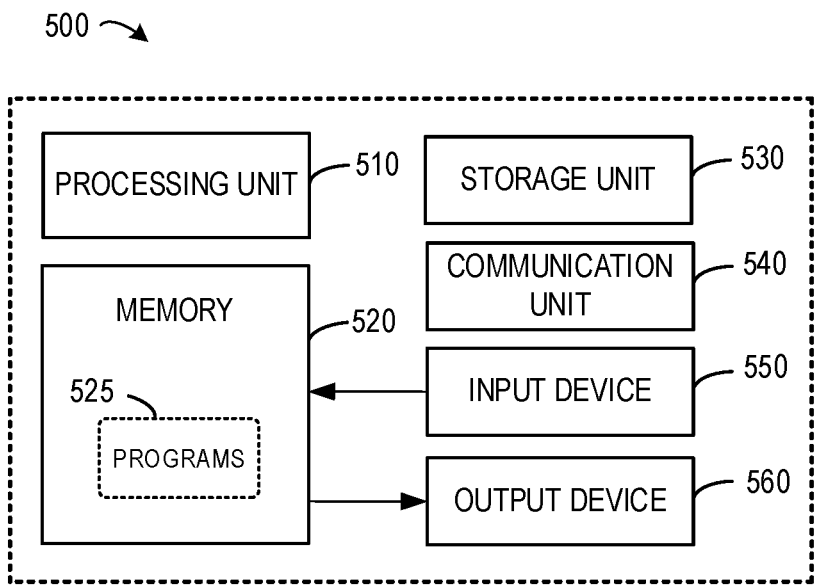
FIG. 5 illustrates a block diagram of an electronic device in which various embodiments of the present disclosure can be implemented.

FIG. 5 illustrates a block diagram of an electronic device 500 in which various embodiments of the present disclosure can be implemented. It would be appreciated that the electronic device 500 shown in FIG. 5 is merely for purpose of illustration, without suggesting any limitation to the functions and scopes of the present disclosure in any manner. The electronic device 500 may be used to implement the above method 500. As shown in FIG. 5, the electronic device 500 may be a general-purpose electronic device. The electronic device 500 may at least comprise one or more processors or processing units 510, a memory 520, a storage unit 530, one or more communication units 540, one or more input devices 550, and one or more output devices 560.

The processing unit 510 may be a physical or virtual processor and can implement various processes based on programs 525 stored in the memory 520. In a multi-processor system, multiple processing units execute computer executable instructions in parallel so as to improve the parallel processing capability of the electronic device 500. The processing unit 510 may also be referred to as a central processing unit (CPU), a microprocessor, a controller, or a microcontroller.

The electronic device 500 typically includes various computer storage medium. Such medium can be any medium accessible by the electronic device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk, or another other media, which can be used for storing information and/or data and can be accessed in the electronic device 500.

The electronic device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further electronic device via the communication medium. In addition, the functions of the components in the electronic device 500 can be implemented by a single computing cluster or multiple computing machines that can communicate via communication connections. Therefore, the electronic device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the electronic device 500 can further communicate with one or more external devices (not shown) such as the storage devices and display device, with one or more devices enabling the user to interact with the electronic device 500, or any devices (such as a network card, a modem, and the like) enabling the electronic device 500 to communicate with one or more other electronic devices, if required. Such communication can be performed via input/output (I/O) interfaces (not shown).

In some embodiments, instead of being integrated in a single device, some, or all components of the electronic device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are illustrated in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single implementation. Rather, various features described in a single implementation may also be implemented in multiple embodiments separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Embodiments of the subject matter and the functional operations described in the present disclosure can be implemented in various systems, digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media, and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any disclosure or of what may be claimed, but rather as descriptions of features that may be specific to particular embodiments of particular disclosures. Certain features that are described in the present disclosure in the context of separate embodiments can also be implemented in combination in a single implementation. Conversely, various features that are described in the context of a single implementation can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are illustrated in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments. Only a few embodiments and examples are described and other embodiments, enhancements and variations can be made based on what is described and illustrated in the present disclosure.

What is claimed is:

1. A method of network diagnosis, comprising:
   obtaining, a user query on the network diagnosis expressed in a natural language;
   determining, based on the user query, a target workflow including a set of machine-executable tasks for a network diagnosis process on a target category of the network diagnosis, wherein the target category is associated with one or more network components; and
   generating a diagnosis result by performing the set of machine-executable tasks in a network diagnosis process.

2. The method of claim 1, wherein obtaining the user query comprises:
   obtaining the user query based on a session-based dialogue, wherein the user query comprises one or more questions.

3. The method of claim 2, wherein determining the target workflow comprises:
   parsing a plurality of reference word slots from the user query;
   in accordance with a determination that at least one first word slot, extracted from the plurality of reference word slots, belongs to a first naming set, determine, from a second naming set based on a mapping between the first naming set and the second naming set, at least one second word slot corresponding to the at least one first word slot;
   determining the target category of the network diagnosis based on the at least one second word slot; and
   selecting, based on the target category, the target workflow from a plurality of candidate workflows in a workflow library.

4. The method of claim 3, further comprising:
   obtaining the mapping between the first naming set and the second naming set, wherein the mapping is determined based on a first set of network terminologies expressed in oral manner contained in the first naming set and a second set of network terminologies expressed in specific manner contained in the second naming set.

5. The method of claim 3, wherein determining the target category of the network diagnosis based on the at least one second word slot comprises:
   encoding the at least one second word slot with respective category name; and
   determining the target category based on a classification of the at least one encoded second word slot by using a machine learning model.

6. The method of claim 3, wherein the machine learning model comprises a large language model, LLM, and wherein the at least one encoded second word slot is classified by using the LLM by:
- determining a set of prompts associated with a plurality of reference categories corresponding to the at least one encoded second word slot; and
- obtaining a reference category selected by the LLM based on the set of prompts; and
- determining the reference category as the target category of the network diagnosis.

7. The method of claim 3, further comprises:
- obtaining the plurality of candidate workflows for processing the network diagnosis on respective categories, wherein each candidate workflow comprises a set of machine-executable tasks that are ordered by a specific processing logic for a category.

8. The method of claim 1, further comprises:
- in accordance with a determination of anomalies of one or more operating network data, identifying the one or more operating network data as a set of alerts.

9. The method of claim 8, wherein generating the diagnosis result comprises:
- check whether at least one alert, retrieved from the set of alerts, is associated with the set of machine-executable tasks in the network diagnosis process; and
- in accordance with a determination that the at least one alert is associated with the set of machine-executable tasks in the network diagnosis process, performing the set of machine-executable tasks based on network monitoring data corresponding to the at least one alert.

10. The method of claim 1, further comprises:
- providing the diagnosis result to a user from which the user query is received.

11. An electronic device, comprising a computer processor coupled to a computer-readable memory unit, the memory unit comprising instructions that when executed by the computer processor implements a method of network diagnosis, the method comprising:
- obtaining, a user query on the network diagnosis expressed in a natural language;
- determining, based on the user query, a target workflow including a set of machine-executable tasks for a network diagnosis process on a target category of the network diagnosis, wherein the target category is associated with one or more network components; and
- generating a diagnosis result by performing the set of machine-executable tasks in a network diagnosis process.

12. The device of claim 11, wherein obtaining the user query comprises:
- obtaining the user query based on a session-based dialogue, wherein the user query comprises one or more questions.

13. The device of claim 12, wherein determining the target workflow comprises:
- parsing a plurality of reference word slots from the user query; and
- in accordance with a determination that at least one first word slot, extracted from the plurality of reference word slots, belongs to a first naming set, determine, from a second naming set based on a mapping between the first naming set and the second naming set, at least one second word slot corresponding to the at least one first word slot;
- determining the target category of the network diagnosis based on the at least one second word slot; and
- selecting, based on the target category, the target workflow from a plurality of candidate workflows in a workflow library.

14. The device of claim 13, further comprising:
- obtaining the mapping between the first naming set and the second naming set, wherein the mapping is determined based on a first set of network terminologies expressed in oral manner contained in the first naming set and a second set of network terminologies expressed in specific manner contained in the second naming set.

15. The device of claim 13, wherein determining the target category of the network diagnosis based on the at least one second word slot comprises:
- encoding the at least one second word slot with respective category name;
- classifying the at least one encoded second word slot by using a machine learning model; and
- determining the target category based on the classification of the at least one encoded second word slot.

16. The device of claim 13, wherein the machine learning model comprises a large language model, LLM, and wherein classifying the at least one encoded second word slot comprises:
- determining a set of prompts associated with a plurality of reference categories corresponding to the at least one encoded second word slot; and
- obtaining a reference category selected by the LLM based on the set of prompts; and
- determining the reference category as the target category of the network diagnosis.

17. The device of claim 13, further comprises:
- obtaining the plurality of candidate workflows for processing the network diagnosis on respective categories, wherein each candidate workflow comprises a set of machine-executable tasks that are ordered by a specific processing logic for a category.

18. The device of claim 11, further comprises:
- in accordance with a determination of anomalies of one or more operating network data, identifying the one or more operating network data as a set of alerts.

19. The device of claim 18, wherein generating the diagnosis result comprises:
- check whether at least one alert, retrieved from the set of alerts, is associated with the set of machine-executable tasks in the network diagnosis process; and
- in accordance with a determination that the at least one alert is associated with the set of machine-executable tasks in the network diagnosis process, performing the set of machine-executable tasks based on network monitoring data corresponding to the at least one alert.

20. A computer program product, the computer program product comprising a non-transitory computer readable storage medium having program instructions embodied therewith, the program instructions executable by an electronic device to cause the electronic device to perform a method of network diagnosis, the method comprising:
- obtaining, a user query on the network diagnosis expressed in a natural language;
- determining, based on the user query, a target workflow including a set of machine-executable tasks for a network diagnosis process on a target category of the network diagnosis, wherein the target category is associated with one or more network components; and generating a diagnosis result by performing the set of machine-executable tasks in a network diagnosis process.

\* \* \* \* \*